US012211266B2

(12) United States Patent
Lee et al.

(10) Patent No.: US 12,211,266 B2
(45) Date of Patent: Jan. 28, 2025

(54) METHOD FOR OBTAINING POSITION INFORMATION USING IMAGE AND ELECTRONIC DEVICE SUPPORTING THE SAME

(71) Applicant: Samsung Electronics Co., Ltd., Suwon-si (KR)

(72) Inventors: Jaemyeon Lee, Suwon-si (KR); Sangbeom Nam, Suwon-si (KR); Youngjun Seo, Suwon-si (KR); Kookyeon Lee, Suwon-si (KR); Chaiman Lim, Suwon-si (KR); Myungkil Kang, Suwon-si (KR); Hyunsu Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 420 days.

(21) Appl. No.: 17/542,800

(22) Filed: Dec. 6, 2021

(65) Prior Publication Data

US 2022/0092872 A1 Mar. 24, 2022

Related U.S. Application Data

(63) Continuation of application No. PCT/KR2021/010912, filed on Aug. 17, 2021.

(30) Foreign Application Priority Data

Aug. 18, 2020 (KR) .................. 10-2020-0103422

(51) Int. Cl.
*G06V 20/10* (2022.01)
*G06V 10/764* (2022.01)
*G06V 20/70* (2022.01)

(52) U.S. Cl.
CPC .......... *G06V 20/176* (2022.01); *G06V 10/764* (2022.01); *G06V 20/188* (2022.01); *G06V 20/70* (2022.01)

(58) Field of Classification Search
None
See application file for complete search history.

(56) References Cited

U.S. PATENT DOCUMENTS 7,804,980 B2 9/2010 Sasaki
8,600,677 B2 12/2013 Jung et al.
(Continued)

FOREIGN PATENT DOCUMENTS

JP 2006-003263 A 1/2006
KR 10-2010-0060549 A 6/2010
(Continued)

OTHER PUBLICATIONS

KR20190134303A_MT English machine translation ; (Year: 2018).*
(Continued)

*Primary Examiner* — Nancy Bitar
(74) *Attorney, Agent, or Firm* — Jefferson IP Law, LLP

(57) ABSTRACT

An electronic device is provided. The electronic device includes a camera that collects image data, a communication circuit that performs communication with an external device, a memory, and a processor. The processor obtains first position information about the electronic device, stores first feature point information based on the first position information, obtains an image via the camera, recognizes an object from the image, extracts second feature point information about the recognized object, and calculates second position information of higher accuracy than the first position information based on comparing the first feature point information with the second feature point information.

13 Claims, 10 Drawing Sheets

(56) References Cited

U.S. PATENT DOCUMENTS

| | | | |
|---|---|---|---|
| 9,766,712 B2 | 9/2017 | Schpok | |
| 10,750,470 B2* | 8/2020 | Pattabiraman | .... H04W 52/0209 |
| 11,255,979 B2 | 2/2022 | Kwon et al. | |
| 2007/0047809 A1 | 3/2007 | Sasaki | |
| 2010/0131195 A1 | 5/2010 | Jung et al. | |
| 2017/0205885 A1 | 7/2017 | Schpok | |
| 2019/0080467 A1* | 3/2019 | Hirzer | ................ G06T 7/73 |
| 2021/0072405 A1 | 3/2021 | Kwon et al. | |
| 2022/0092872 A1* | 3/2022 | Lee | ..................... G06T 7/11 |
| 2022/0404170 A1* | 12/2022 | Tanaka | ............ G01C 21/3822 |

FOREIGN PATENT DOCUMENTS

| | | | | |
|---|---|---|---|---|
| KR | 10-2013-0086509 A | | 8/2013 | |
| KR | 10-2015-0042544 A | | 4/2015 | |
| KR | 10-2017-0015754 A | | 2/2017 | |
| KR | 20190012534 A | * | 2/2019 | ......... G01C 21/3407 |
| KR | 10-2019-0027172 A | | 3/2019 | |
| KR | 10-2019-0134303 A | | 12/2019 | |
| KR | 2019134303 A | * | 12/2019 | ......... G06K 9/00711 |
| KR | 10-2105590 B1 | | 4/2020 | |
| KR | 10-2020-0065144 A | | 6/2020 | |
| KR | 20200065144 A | * | 6/2020 | ............. G01C 21/30 |
| KR | 10-2020-0087349 A | | 7/2020 | |

OTHER PUBLICATIONS

KR20200065144A_MT English machine translation ; Yoo Wang Geon (Year: 2020).*

KR20190134303AÂ·Dec. 4, 2019 (Year: 2019).*

* cited by examiner

METHOD FOR OBTAINING POSITION INFORMATION USING IMAGE AND ELECTRONIC DEVICE SUPPORTING THE SAME

CROSS-REFERENCE TO RELATED APPLICATION(S)

This application is a continuation application, claiming priority under § 365(c), of an International application No. PCT/KR2021/010912, filed on Aug. 17, 2021, which is based on and claims the benefit of a Korean patent application number 10-2020-0103422, filed on Aug. 18, 2020, in the Korean Intellectual Property Office, the disclosure of which is incorporated by reference herein in its entirety.

BACKGROUND

1. Field

The disclosure relates to a method for obtaining position information using an image and an electronic device supporting the same.

2. Description of Related Art

An electronic device such as a smartphone or a tablet personal computer (PC) may capture an image using its camera. The electronic device may analyze the image captured using the camera and may provide position information. As a result, a user easily recognizes his or her current position and may quickly move to a desired place.

The above information is presented as background information only to assist with an understanding of the disclosure. No determination has been made, and no assertion is made, as to whether any of the above might be applicable as prior art with regard to the disclosure.

SUMMARY

When providing position information using an image, an electronic device may provide position information by means of comparison between a previously captured image and a currently captured image. In this case, the amount of calculation for extracting a feature point from each of the actually captured images may increase. Thus, the time the user waits may increase.

Furthermore, when camera settings or capture environments between the actually captured images are different from each other, it may be difficult to extract a feature point. Thus, accurate position information may fail to be provided to the user.

Aspects of the disclosure are to address at least the above-mentioned problems and/or disadvantages and to provide at least the advantages described below. Accordingly, an aspect of the disclosure is to provide position information using an image.

Additional aspects will be set forth in part in the description which follows and, in part, will be apparent from the description, or may be learned by practice of the presented embodiments.

In accordance with an aspect of the disclosure, an electronic device is provided. The electronic device includes a camera module configured to collect image data, a communication circuit configured to perform communication with an external device, a memory, and a processor. The processor may obtain first position information about the electronic device, may store first feature point information based on the first position information, may obtain an image by means of the camera module, may recognize an object from the image, may extract second feature point information about the recognized object, and may calculate second position information of higher accuracy than the first position information based on comparing the first feature point information with the second feature point information.

The electronic device according to various embodiments disclosed in the disclosure may provide a user with accurate position information by means of feature point comparison between an image extracted from a three-dimensional virtual map rendered based on text information about terrain or feature and an actually captured image.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
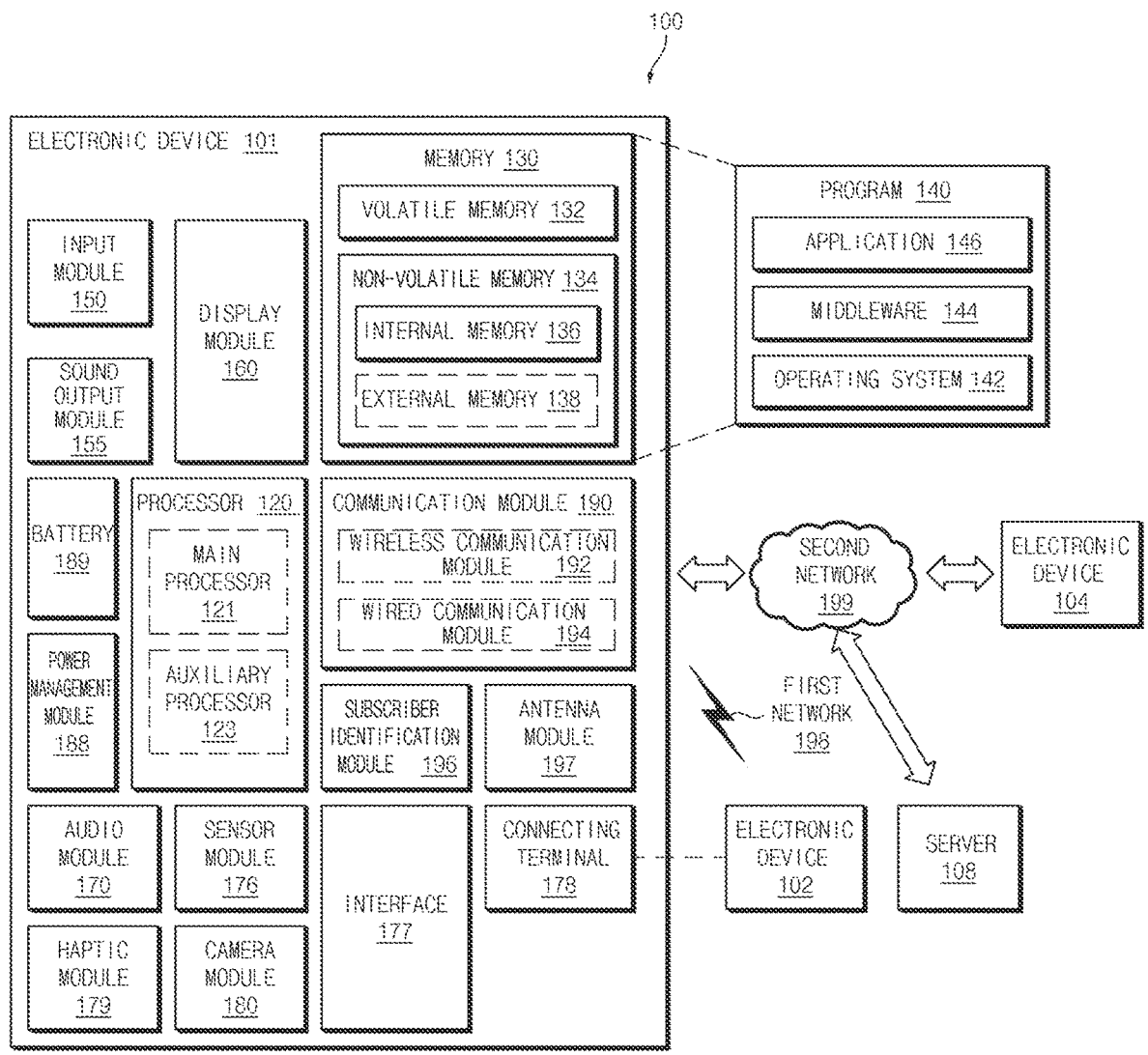
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
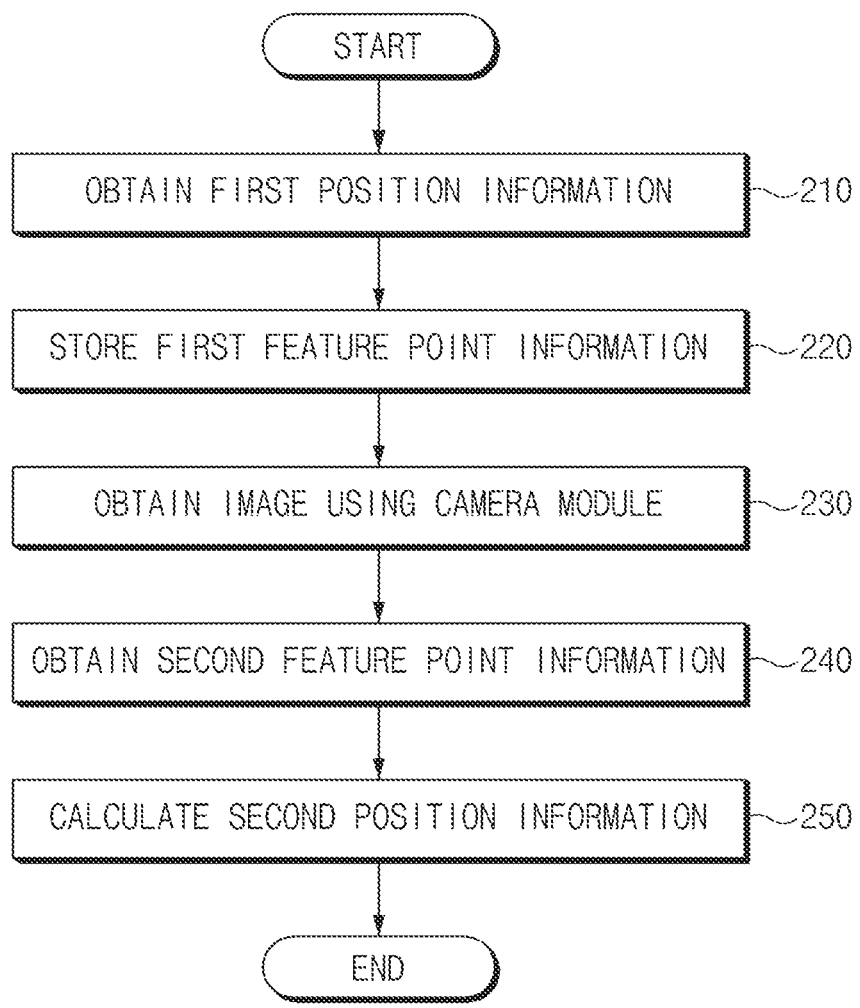
FIG. 2 illustrates a method for obtaining position information using an image according to an embodiment of the disclosure.

FIG. 2 illustrates a method for obtaining position information using an image according to an embodiment of the disclosure.

Operations 210 to 250 according to various embodiments may be performed by at least one component (e.g., a processor 120 of FIG. 1) of an electronic device 101 of FIG. 1.

Referring to FIG. 2, in operation 210, a processor 120 may obtain first position information of an electronic device 101. The first position information may include at least one of, for example, latitude/longitude information and/or azimuth angle information. For example, the processor 120 may obtain first position information by means of at least one of a wireless communication module (e.g., a wireless communication module 192 of FIG. 1) and/or a sensor module (e.g., a sensor module 176 of FIG. 1). The wireless communication module 192 may receive position information from a global navigation satellite system (GNSS) (e.g., a global positioning system (GPS)) and/or a base station included in a cellular network (e.g., a second network 199 of FIG. 1). The sensor module 176 may include at least one inertia sensor (e.g., an accelerometer, a gyroscope, and/or a magnetometer).

According to various embodiments, the first position information may be information with relatively low accuracy, which is obtained by means of the wireless communication module (e.g., the wireless communication module 192 of FIG. 1) and/or the sensor module (e.g., the sensor module 176 of FIG. 1). For example, the first position information collected using the wireless communication module 192 and/or the sensor module (e.g., the sensor module 176 of FIG. 1) in an urban area where tall buildings or steel structures are concentrated may include latitude/longitude information and/or azimuth angle information, which have/has a difference in first error range with a real position or an azimuth angle of the electronic device 101. The first error range may include, for example, a range of dozens of meters or a range of dozens of degrees, but not limited thereto.

In operation 220, the processor 120 may store first feature point information based on the first position information. The first feature point information may be extracted from a three-dimensional virtual map (hereinafter, referred to as a 3D virtual map) rendered based on text information about terrain or feature. The first feature point information may include at least one one-dimensional hash vector.

According to an embodiment, the processor 120 may generate a 3D virtual map in the electronic device 101 and may extract at least one first feature point information from a region (hereinafter, referred to as a first virtual region) on the 3D virtual map corresponding to the first position information. The first virtual region may include a position and a surrounding region (within a 1 km radius or within a 1 km in a plurality of specified directions) corresponding to the first position information. For example, the processor 120 may extract a one-dimensional vector corresponding to a position per a specified direction (e.g., 5 degrees) and/or per a specified distance (e.g., 1 m) in the first virtual region as the first feature point information.

According to an embodiment, the processor 120 may transmit the first position information to a server 108 through a communication module 190 and may receive data for the first virtual region corresponding to the first position information on the generated 3D virtual map from the server 108. The processor 120 may extract the first feature point information from the data for the first virtual region.

According to another embodiment, the processor 120 may transmit the first position information to the server 108 through the communication module 190 and may receive the first feature point information about the first virtual region.

According to an embodiment, the processor 120 may store at least temporarily the extracted or received first feature point information in a memory (e.g., a memory 130 of FIG. 1).

Various embodiments about the generation of the 3D virtual map will be described below with reference to FIG. 3.

In operation 230, the processor 120 may obtain an image (e.g., a captured image or a real image) using a camera module (e.g., a camera module 180 of FIG. 1. According to an embodiment, the image may be a preview image of a camera application. According to another embodiment, the image may be an image which is captured by means of the camera module 180 and is stored in the electronic device 101.

According to various embodiments, when obtaining the image by means of the camera module 180, the processor 120 may obtain image capture setting information (e.g., an angle of view, and/or a zoom magnification setting) and/or environmental information (e.g., weather and/or time) together.

In operation 240, the processor 120 may obtain second feature point information from the image. The second feature point information may include at least one one-dimensional hash vector. For example, the processor 120 may recognize an object (e.g., a building, a tree, a car, or a person) included in the image using a specified object recognition algorithm. The processor 120 may detect a border line of the recognized object and may convert the border line into data easy to extract a feature point. For example, the processor 120 may obtain the second feature point information from the converted data.

According to another embodiment, the processor 120 may store at least temporarily store the extracted second feature point information in the memory (e.g., the memory 130 of FIG. 1).

The extraction of the feature point according to various embodiments will be described below with reference to FIGS. 4 to 8.

In operation 250, the processor 120 may calculate second position information based on comparing the first feature point information extracted from the 3D virtual map with the second feature point information extracted from the image obtained by means of the camera module 180. The second position information may have higher accuracy than the first position information. For example, in an urban area where tall buildings or steel structures are concentrated, the second position information may include latitude/longitude information and/or azimuth angle information, which are/is the same as a real position and/or an azimuth angle of the electronic device 101 or have/has a second error range less than the first error range. For example, the second error range may include, for example, a range less than dozens of meters or a range less than dozens of degrees, but not limited thereto.

According to various embodiments, the processor 120 or the server 108 may measure a similarity between a plurality of first images (e.g., virtual images) extracted from the first virtual region of the 3D virtual map and the second image (e.g., the captured image) obtained by means of the camera module 180 and may calculate the second position information. The plurality of first images may be extracted per a specified direction (e.g., 5 degrees) and/or per a specified distance (e.g., 1 m) in the first virtual region. In various embodiments of the disclosure, it is described that the first image is extracted for convenience of description, but it should be noted that it is able to only a feature vector of the first virtual region. For example, the processor 120 or the server 108 may extract only a feature vector without performing an operation of capturing and storing the image from the first virtual region.

Figure 6:
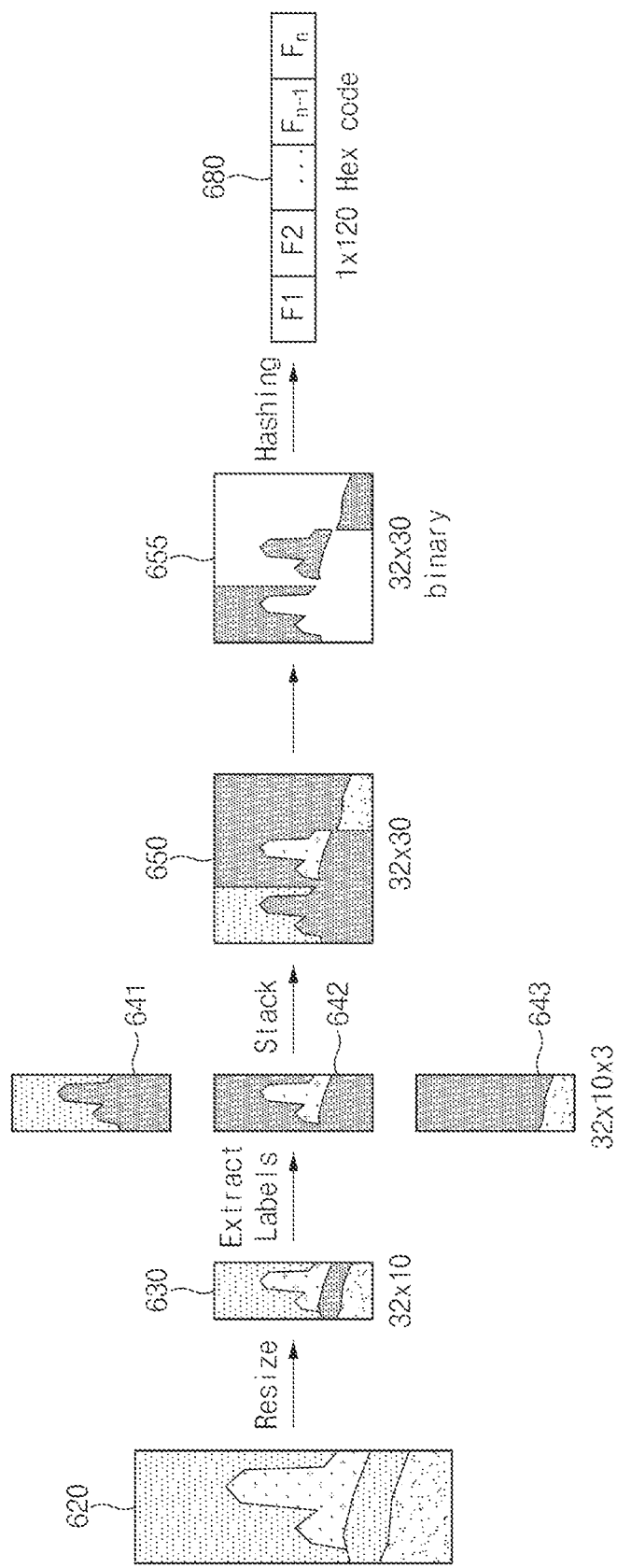
FIG. 6 illustrates vector generation using a geographic feature image according to an embodiment of the disclosure.

For example, the processor 120 or the server 108 may extract each of a hash vector (or a feature vector) of the first image and a hash vector of the second image by means of an image hashing algorithm (refer to FIG. 6). For example, the hash vector may be in the form of a one-dimensional bit array or a hex string. The processor 120 or the server 108 may determine the first image with a minimum hash hamming distance between the hash vector of the first image and the hash vector of the second image as being most similar to the second image. The hash hamming distance may be determined by comparing respective elements of the same position of each vector and counting the number of bits or characters having different values (e.g., 0, 1, or a character). The processor 120 or the server 108 may calculate a position and an azimuth angle corresponding to the determined first image as the second position information.

According to various embodiments, after calculating the second position information, the processor 120 may detect a change in state of the electronic device 101. For example, the processor 120 may reduce a re-search radius of the first feature point information based on the second position information and the amount of change of sensing information collected by means of the sensor module, which is input in real time, to quickly correct a position and an azimuth angle.

According to various embodiments, at least some of the operations performed by the processor 120 in FIG. 2 may be performed by means of the server 108.

Figure 3:
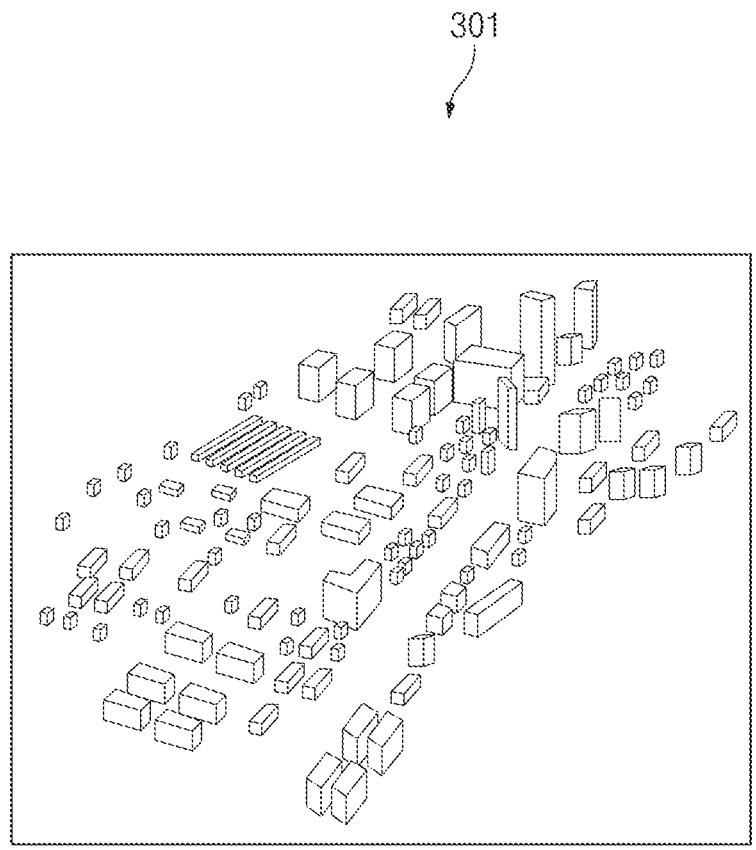
FIG. 3 illustrates generation of a three dimensional (3D) virtual map according to an embodiment of the disclosure.

FIG. 3 illustrates generation of a 3D virtual map according to an embodiment of the disclosure.

Referring to FIG. 3, a processor 120 of an electronic device 101 or a server 108 may generate a 3D virtual map 301. The 3D virtual map 301 may be a map rendered and generated based on text information, such as elevation data (e.g., the highest height above sea level) and/or artificial structure data, rather than an actually captured image.

According to various embodiments, the 3D virtual map 301 may fail to include information about a detailed shape or a color of a facility and/or a building. For example, all of buildings included in the 3D virtual map 301 may have the same type of figure (e.g., a rectangular parallelepiped), a shape similar to the shape of the earth, or a shape in which a shape of a facility and/or a building is simplified, which may be rendered to differ in size and/or height based on text information.

According to an embodiment, the elevation data may be text including height information about a specific point of the ground. The elevation data may be a numerical model applied to one coordinate system.

According to an embodiment, the artificial structure data may be text including information about a ground size or a height of a building or a facility. The artificial structure data may be managed by means of a separate server, and the processor 120 may request the server (e.g., the server 108 or an additional server (not shown)) to receive and store the artificial structure data. For example, the artificial structure data may include an infrastructure (e.g., a road, a park, and/or a railroad) and/or position information (e.g., an address) of a building, ground information (e.g., an area or a shape), or height information (e.g., the number of floors in the building).

According to an embodiment, the artificial structure data may include a three-dimensional model for a facility or a building. For example, the three-dimensional model may be in the form of a vector or in the form of having height information about each point. When there is a three-dimensional model for an artificial structure, the processor 120 or the server 108 may apply a coordinate system applied to elevation data to the three-dimensional model for the artificial structure to generate the 3D virtual map 301.

According to various embodiments, the artificial structure data may fail to include a three-dimensional model for a facility or a building. In this case, the processor 120 or the server 108 may reflect height information of each building in a two-dimensional model (e.g., where a ground shape is displayed as a plane) for a facility or a building to generate a three-dimensional model for an artificial structure. The processor 120 or the server 108 may extrude the floor of a building by a height using height information of a two-dimensional model to generate a three-dimensional model for an artificial structure.

According to an embodiment, the artificial structure data may define a height of a facility or a building, the number of floors in the building, or an interfloor height of the building. The processor 120 or the server 108 may extrude the floor of the building from a virtual ground by a height of the corresponding building included in the artificial structure data or the number of floors*an interfloor height (e.g., a value of an average interfloor height) to generate a three-dimensional model.

According to an embodiment, the processor 120 or the server 108 may reflect an actual shape of the building to generate a three-dimensional model for an artificial structure. For example, the processor 120 or the server 108 may generate a shape (or exterior) of the building in the form of a quadrangle depending to a default setting. Alternatively, when there is separate data for the actual shape of the building (e.g., when shape data in which the top is unique, for example, the Chrysler Building, is included), the processor 120 or the server 108 may reflect the data in the shape of the building.

According to various embodiments, the processor 120 or the server 108 may additionally reflect (e.g., add) elevation data corresponding to each coordinates in the three-dimensional model generated based on the artificial structure data to generate the 3D virtual map 301 in which a natural object and an artificial structure are added.

According to various embodiments, data for generating the 3D virtual map may further include natural object data. For example, the natural object data may include information associated with a position of a river and/or a river width.

Figure 4:
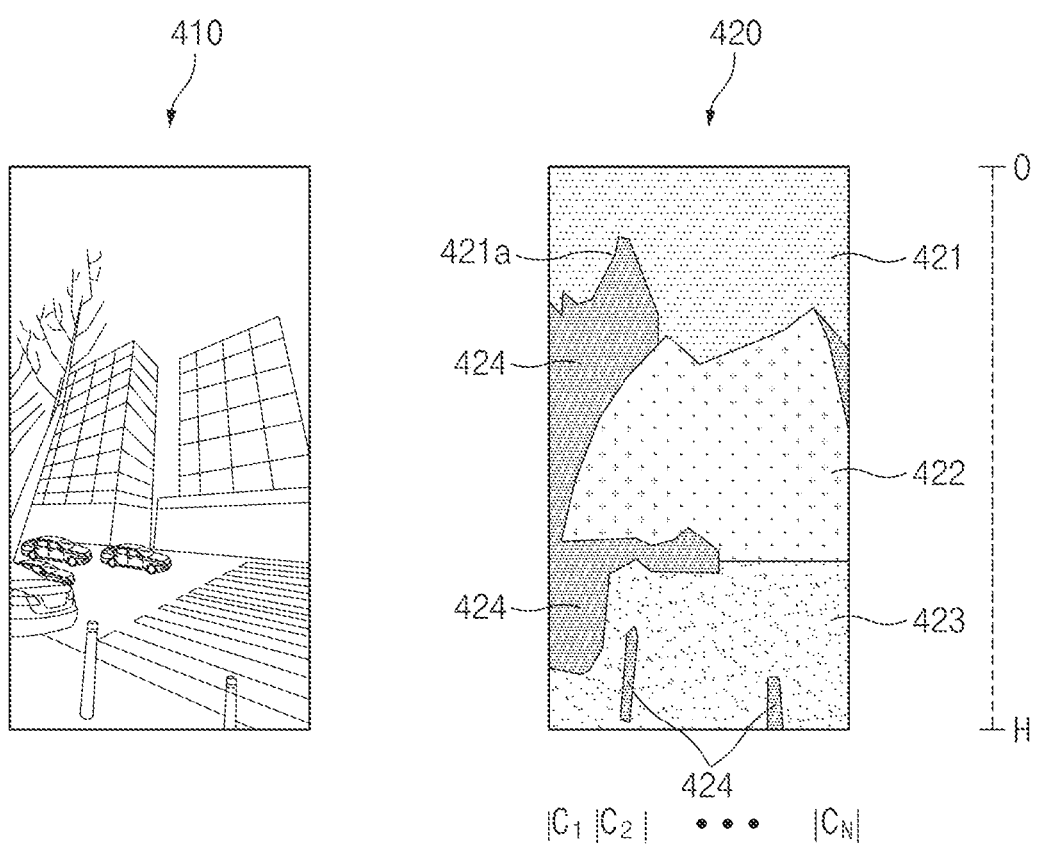
FIG. 4 illustrates recognition and classification of geographic features in an image obtained by means of a camera module according to an embodiment of the disclosure.

FIG. 4 illustrates recognition and classification of geographic features in an image obtained by means of a camera module according to an embodiment of the disclosure.

Referring to FIG. 4, a processor 120 may obtain an original image (or a captured image) 410. According to an embodiment, the original image 410 may be an image obtained through a preview screen of a camera module 180. According to another embodiment, the original image 410 may be an image which is captured by means of the camera module 180 and is stored in an electronic device 101.

According to various embodiments, the processor 120 may store the original image 410 together with position information of the electronic device 101, which is obtained by means of a wireless communication module (e.g., a wireless communication module 192 of FIG. 1) and/or a sensor module (e.g., a sensor module 176 of FIG. 1) of the electronic device 101. For example, the processor 120 may store latitude/longitude information and/or azimuth angle information of the electronic device 101, which is calculated using a GPS sensor and an inertial sensor (an accelerometer, a gyroscope, and/or a magnetometer) at a time when the original image 410 is captured, together with the original image 410 in a memory (e.g., a memory 130 of FIG. 1).

According to various embodiments, the processor 120 may recognize an object from the original image (or the captured image) 410 and may classify the recognized object into specified items to generate a geographic feature image 420. The items may be preset and stored for various objects other than an object included in the original image 410. The geographic feature image 420 may be an image obtained by classifying the recognized object into specified items and dividing arrangement regions of the specified items. The processor 120 may classify each pixel in the original image 410 for each object (or classify whether each pixel is included any object) and may recognize an object (e.g., the sky, a building, a road, a pole).

According to an embodiment, the processor 120 may classify the object recognized from the original image 410 into specified items. The items may be preset and stored for various objects other than an object included in the original image 410 (e.g., the sky, a building, a road, a person, a car, and/or a pole). The specified item may be divided and specified into a plurality of groups.

According to an embodiment, the specified item may be classified into a first group and a second group. The first group may be a group obtained by classifying objects, which are large in size (are above a reference pixel range (e.g., 10%) in the image) and are fixed, into a specified item. For example, the first group may include an object which is fixed or is large in size, for example, the sky, a building, or a road, as a specified item. The second group may include an object, which is relatively smaller in size than the first group and is moved, as a specified item. For example, the second group may include an object, such as a pole, a pedestrian, a vehicle, or vegetation, as a specified item. Alternatively, the second group may further include an object in which it is impossible to identify the recognized object. For another example, the second group may include all objects which are not included in the first group among the recognized objects.

According to an embodiment, the processor 120 may perform first classification for dividing the recognized object into items of the first group. For example, the first image may include three specified times such as the sky, a structure (e.g., a building or a wall), and a road (e.g., a roadway or a sidewalk). The processor 120 may classify the object recognized from the original image 410 as the sky, the structure (e.g., the building or the wall), or the road (e.g., the roadway or the sidewalk) and may generate the geographic feature image 420 in which an arrangement region corresponding to each object is divided. The generated geographic feature image 420 may be an image obtained by dividing objects classified into the specified items into arrangement regions. For example, the geographic feature image 420 may include a sky arrangement region 421 including the sky classified based on the first group, a building arrangement region 422 including at least one building, or a road arrangement region 423 including at least one road.

According to an embodiment, the processor 120 may classify the recognized object using a pre-trained semantic segmentation deep learning model (a model example: HRnetV2 or DeepLabV3). Alternatively, the processor 120 may use another object recognition model or algorithm, but not limited thereto.

According to various embodiments, the processor 120 may perform second classification for dividing objects recognized from the original image 410 into items of the second group. For example, the second group may include four items such as a pole (e.g., a street light, traffic lights, or a sign), a person, a vehicle (e.g., a car or a motorcycle), vegetation, and an unknown object.

According to various embodiments, the processor 120 may divide objects classified based on the second group, which are included in the geographic feature image 420, into an arrangement region. For example, the geographic feature image 420 may include the other arrangement region 424 corresponding to at least one object classified based on the second group.

According to various embodiments, although not illustrated, the processor 120 may change (or replace) an object which belongs to the second group to an object which belongs to the first group depending on a specified condition. For example, the processor 120 may change a pole or traffic lights between buildings to a building.

Alternatively, the processor 120 may include an object which belongs to the second group in an arrangement region corresponding to an object which belongs to the first group in the geographic feature image 420. For example, the processor 120 may include an object recognized as a pole or traffic lights included between buildings in the building arrangement region 422 and may include an object recognized as a tree in the sky arrangement region 421. Various embodiments about the classification and change of the object will be described below with reference to FIG. 5.

According to an embodiment, the processor 120 may correct a border between the sky and another object by means of additional image processing (e.g., an edge detection algorithm) As a result, the processor 120 may reduce a probability of incorrectly recognizing a portion of the sky as a portion of a building or a road or incorrectly recognizing a portion of the building or the road as the sky depending on a weather state (e.g., movement of a cloud or the sun) of the sky or arrangement of artificial objects (e.g., arrangement of wires). After performing the additional image processing, the processor 120 may determine the sky arrangement region 421 corresponding to the sky on the geographic feature image 420.

According to an embodiment, the processor 120 may detect a border of an arrangement region of an object (hereinafter, referred to as a sky border line 421*a*), which is different from the sky arrangement region 421, by means of the edge detection algorithm.

For example, the processor 120 may detect an edge image (e.g., an edge image 720 of FIG. 7) of the original image 410. The processor 120 may detect a height of a border point where a value greater than a specified first threshold is indicated for the first time while moving from an upper end (h=0) to a lower end (h=H) for each column $C_1$, $C_2$ . . . or $C_N$ of the edge image. The column may refer to a column of pixels divided into a specified number of pixels (e.g., 1 or 2).

According to various embodiments, the first threshold may vary with a characteristic of the original image 410. The first threshold value may be differently set, when two regions (the sky/an object except for the sky) have very similar colors (or contrast) or have very different colors (or contrast). For example, the first threshold value may be determined as a value with a maximum difference between pixel values with respect to a border line calculated when applying all of values between from 10 to 300.

The processor 120 may detect a sequence of heights of border points detected for each column and may determine the sky border line 421*a* using the sequence. To perform fine tune, the processor 120 may filter an interval where a change in the sky border line 421*a* is greater than or equal to a specified second threshold to adjust the sky border line 421*a*.

According to various embodiments, the second threshold may vary with a height of the original image 410. For example, when the height of the original image 410 is 300 pixels, the second threshold may be 30 pixels.

According to various embodiments, the processor 120 may set a pixel located above the sky border line 421*a* to a first value (e.g., 1) and may set a pixel located below the sky border line 421*a* to a second value (e.g., 0) to generate a sky mask.

Figure 5:
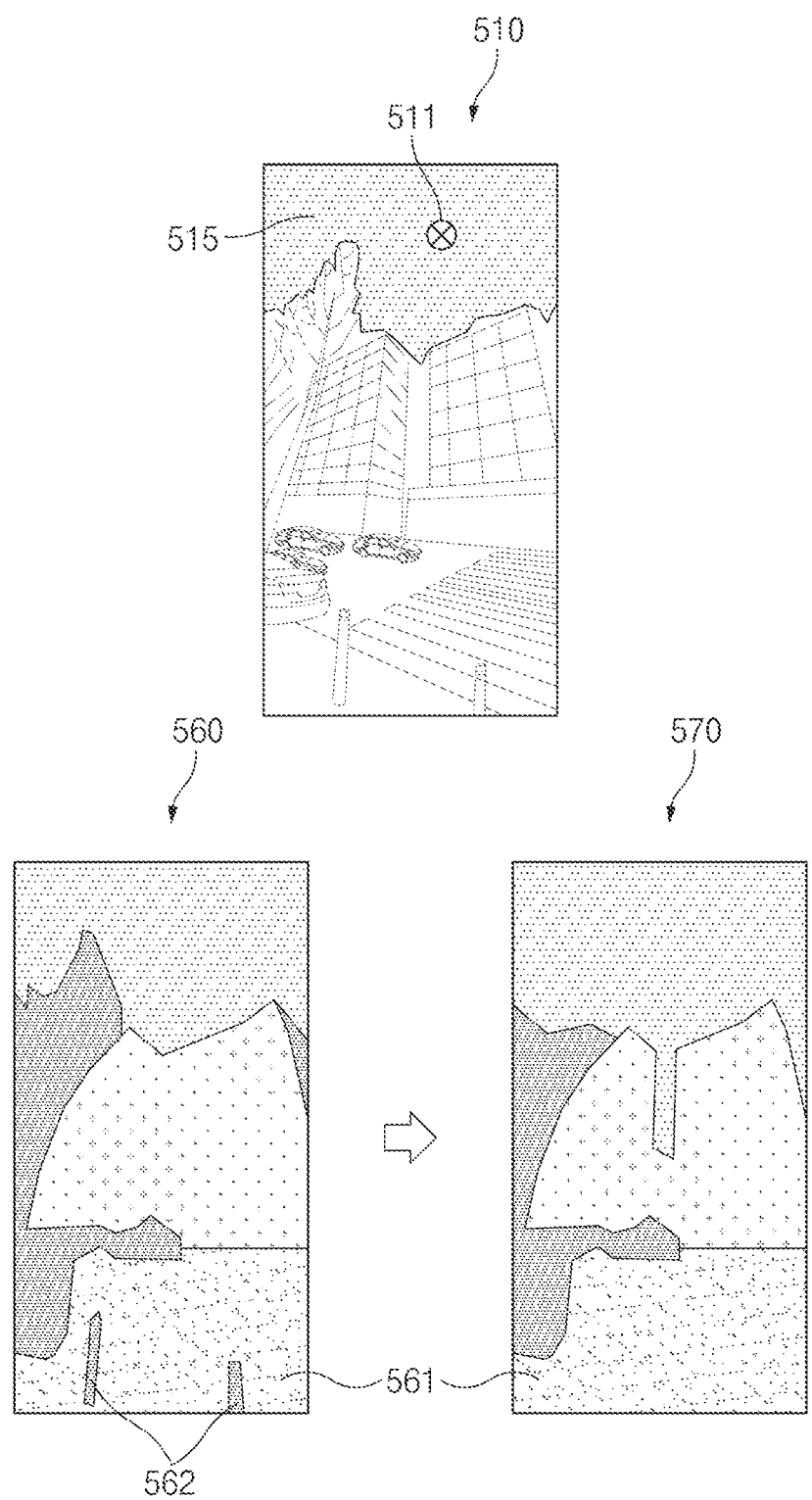
FIG. 5 illustrates reclassification of geographic features according to an embodiment of the disclosure.

FIG. 5 illustrates reclassification of geographic features according to an embodiment of the disclosure.

Referring to FIG. 5, a processor 120 may extract a similar color region 515 with respect to a specific pixel 511 of an original image (or a captured image) 510. The specific pixel 511 may be selected based on one of pixels occupying the most color in the original image 510 or one of pixels included in the most characteristic object. For example, the specific pixel 511 may be one pixel, which is a pixel located in the center.

The similar color region 515 may be a region where a change in RGB color is less than or equal to a specified value and where the change in color, which is less than or equal to the specified value, is maintained in at least one of specified directions (e.g., eight directions of 0 degree, 45 degrees, 90 degrees, 135 degrees, 180 degrees, 225 degrees, 270 degrees, and 315 degrees) with respect to a pixel adjacent to (or touching with) a corresponding pixel.

According to various embodiments, the processor 120 may divide the original image (or the captured image) 510 into a plurality of tiles (e.g., N*M square tiles) and may extract the similar color region 515 with respect to a center point (or any position) of each tile.

According to various embodiments, when pixels in the similar color region 515 include an object included in a first group and an object included in the second group, the processor 120 may replace a pixel corresponding to the object included in the second group in the similar color region 515 with the object included in the first group.

For example, when the number of pixels corresponding to the object included in the first group among pixels in the similar color region 515 is greater than or equal to a specified number (e.g., 4), the processor 120 may replace a pixel corresponding to the object included in the second group in the similar color region 515 with the object included in the first group (more than half).

For another example, when pixels in the similar color region 515 are less than or equal to a specified number (e.g., 4) and when there is an object in the first group in the similar color region 515, the processor 120 may replace a pixel corresponding to the object included in the second group in the similar color region 515 with the object included in the first group (an edge portion).

For example, a first geographic feature image 560 may include poles of the second group in a road arrangement region 561 of the first group. When the road arrangement region 561 of the first group and the pole arrangement region 562 of the second group are determined as a similar color region, the processor 120 may generate a second geographic feature image 570 by replacing the pole arrangement region 562 with the road arrangement region 561.

According to various embodiments, the processor 120 may extract each object contour from the object of the second group. The processor 120 may replace a pixel, classified as a geographic feature, in which a horizontal (or vertical) length of the extracted contour is less than or equal to a specified ratio (e.g., 1/5) of a width (or height) of the original image 510 and in which left and right (or upper and lower) pixels outside the contour are the same as each other, with a geographic feature by first classification.

FIG. 6 illustrates vector generation using a geographic feature image according to an embodiment of the disclosure.

Referring to FIG. 6, a processor 120 may generate a geographic feature image 620 based on an original image (e.g., an original image 410 of FIG. 4 or an original image 510 of FIG. 5). The geographic feature image 620 may be generated by performing first classification and second classification of an object included in the original image.

According to various embodiments, the processor 120 may convert the geographic feature image 620 into a one-dimensional vector (hereinafter, referred to as a hash feature vector) for matching a feature point.

According to an embodiment, the processor 120 may resize the geographic feature image 620 (e.g., 64*20) to generate a reduced geographic feature image 630. In FIG. 6, a 50% reduction ratio is illustratively shown, but not limited thereto. For example, the reduction ratio may be 30%, 15%, or 5%.

According to an embodiment, the processor 120 may divide the reduced geographic feature image 630 depending on an arrangement region. For example, the processor 120 may divide the reduced geographic feature image 630 for each classified arrangement region to a first division image 641 corresponding to a sky arrangement region, a second division image 642 corresponding to a building arrangement region, and a third division image 643 corresponding to a road arrangement region. Each of the first to third division images 641, 642, and 643 may have the same size as the reduced geographic feature image 630.

According to an embodiment, the processor 120 may arrange the first to third division images 641, 642, and 643 in a specified direction (e.g., a horizontal direction) to generate one combination image 650. For example, when the first to third division images have a size of 10 horizontal pixels and 32 vertical pixels, they may be arranged in a horizontal direction to generate the combination image 650 having a size of 32 vertical pixels and 30 horizontal pixels. The processor 120 may generate a binary image 655 for the combination image 650. The binary image 655 may be an image composed of two colors (e.g., a black color and a white color). The binary image 655 may be an image, a pixel having a color value greater than 0 of which is written with a first value (e.g., 1) and the other color values of which are displayed with a second value (e.g., 0).

According to an embodiment, the processor 120 may generate a hex code in units of eight pixels (bits) of the binary image 655 to generate a hash feature vector 680.

Figure 7:
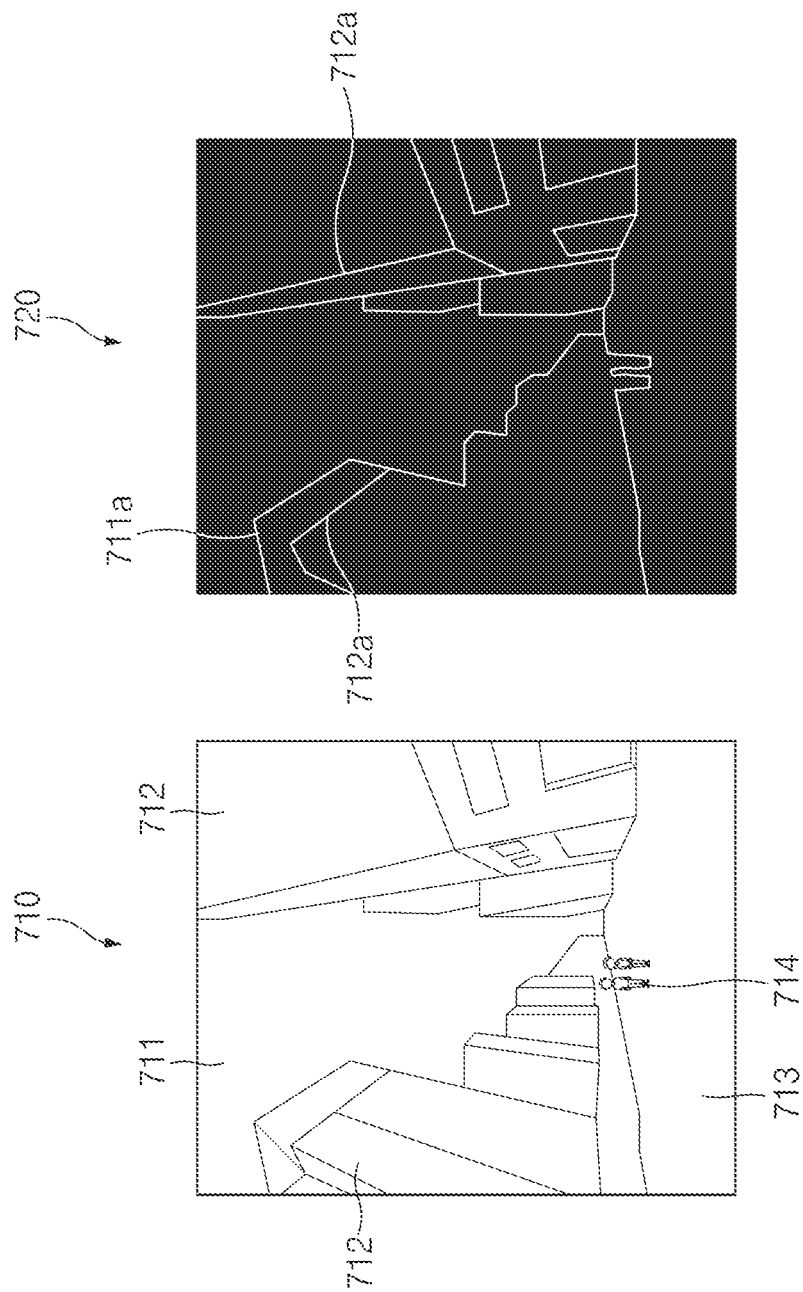
FIG. 7 illustrates detection of a border line of an object according to an embodiment of the disclosure.

FIG. 7 illustrates detection of a border line of an object according to an embodiment of the disclosure.

Referring to FIG. 7, a processor 120 may detect a border line from an original image 710 captured by means of a camera module 180 to generate an edge image 720. The original image 710 may include various objects (e.g., a building, a road, the sky, a person, or a tree). For example, the original image 710 may include the sky 711, a building 712, a road 713, or a person 714.

According to an embodiment, the processor 120 may extract an object, for example, a border line of the building 712, from the original image 710, by means of an edge detection technology in an image processing scheme. For example, the processor 120 may detect pixels where a brightness of the image rapidly changes to a specified threshold or more. The processor 120 may detect at least one of a change in material property and/or a change in scene illumination to detect an edge.

According to an embodiment, the processor 120 may generate (or extract) the edge image 720 based on the original image 710, by means of edge detection. The edge image 720 may mainly display a border line between the sky 711 and the building 712. The processor 120 may perform image processing of the original image 710 of an RGB pixel using an edge detection technique to extract a sky border line 711a and/or a building contour 712a.

Figure 8:
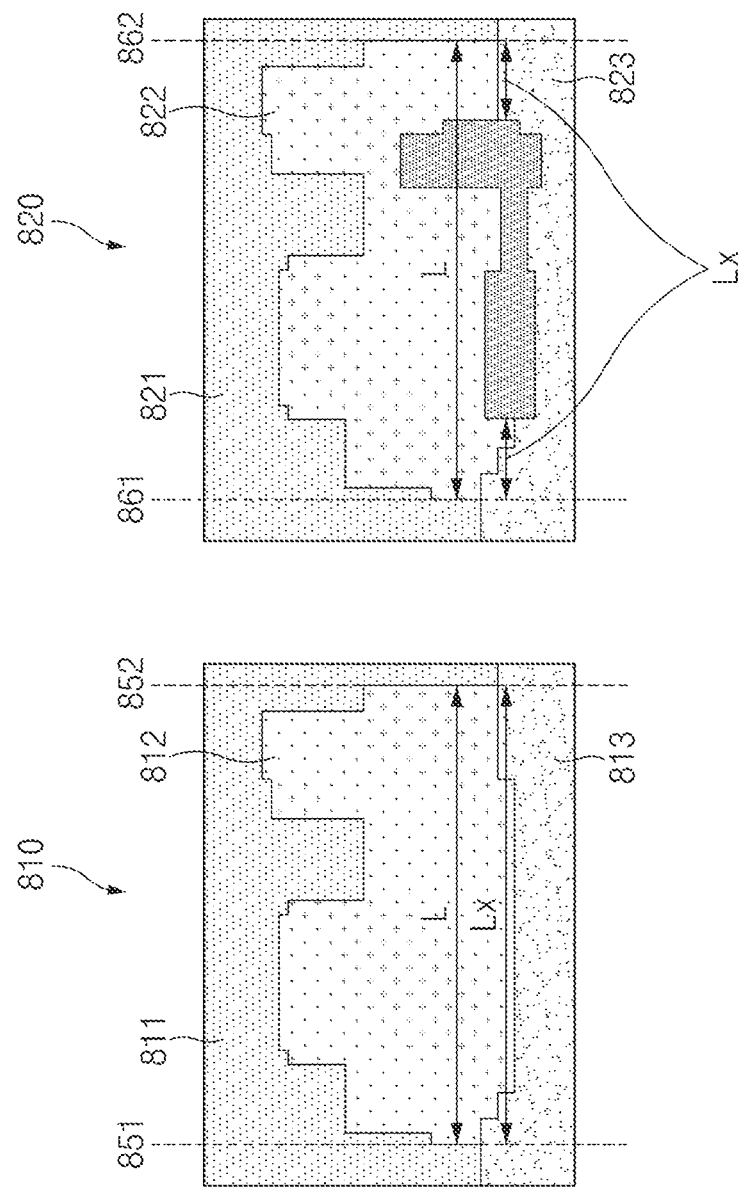
FIG. 8 illustrates verification for detection of geographic features according to an embodiment of the disclosure.

FIG. 8 illustrates verification for detection of geographic features according to an embodiment of the disclosure.

Referring to FIG. 8, a processor 120 may extract a feature point using a geographic feature image to enhance accuracy of first position information calculated by means of a GPS or a wireless network to verify whether it is able to calculate second position information. When it is verified, the geographic feature image may be compared with an image of a 3D virtual map.

For example, the processor 120 may verify whether the generated first geographic feature image 810 includes a feature point of a level capable of calculating position information (e.g., second position information) of an electronic device 101. When a specified verification condition is not met, the processor 120 may capture a new image to generate a geographic feature image again.

According to various embodiments, the processor 120 may identify whether the first geographic feature image 810 includes objects of a first group, which are greater than or equal to a specified number. For example, when the first geographic feature image 810 includes two or more objects of the first group, the processor 120 may perform feature point comparison.

According to an embodiment, the processor 120 may identify whether a pixel ratio (hereinafter, referred to as a blockage ratio) occupied by an object of a second group in a second geographic feature image 820 is less than or equal to a specified reference value. For example, the number of pixels in the second geographic feature image 820 is H*W and when the number of pixels of the second group is NB, the blockage ratio may be defined as NB/(H*W). When the blockage ratio is less than or equal to the specified reference value, feature point matching may be performed.

According to an embodiment, the processor 120 may identify a ratio of pixels (hereinafter, referred to as a geographic feature border line securing rate) which are not hidden by an object (e.g., a pole, a person, or a car) of the second group between border lines (hereinafter, geographic feature border lines) between objects (e.g., the sky, a building, and a road) included in the first group in the second geographic feature image 820.

According to an embodiment, in the first geographic feature image 810, the processor 120 may calculate a distance L in a horizontal direction from a first column 851 where a border of the first group (a board between a first object 811 and a second object 812) appears for the first time to a second column 852 where the border of the first group last appears. Furthermore, the processor 120 may calculate the number Nx of columns including a border between the second object 812 and a third object 813, between the first column 851 and the second column 852. In the first geographic feature image 810, the geographic feature border line ensuring rate (L/Nx) may be greater than or equal to (or greater than) a specified reference value (e.g., 0.5) and feature point matching may be performed.

In the second geographic feature image 820, the processor 120 may calculate a distance L in a horizontal direction from a first column 861 where the border of the first group (the border between the first object 821 and the second object 822) appears for the first time to a second column 862 where the border of the first group last appears. Furthermore, the processor 120 may calculate the number Nx of columns including a border between the second object 822 and the third object 823, between the first column 861 and the second column 862. In the second geographic feature image 820, the geographic feature border line ensuring rate (L/Nx) may be less than (or less than or equal to) the specified reference value (e.g., 0.5) and feature point matching may fail to be performed.

Figure 9:
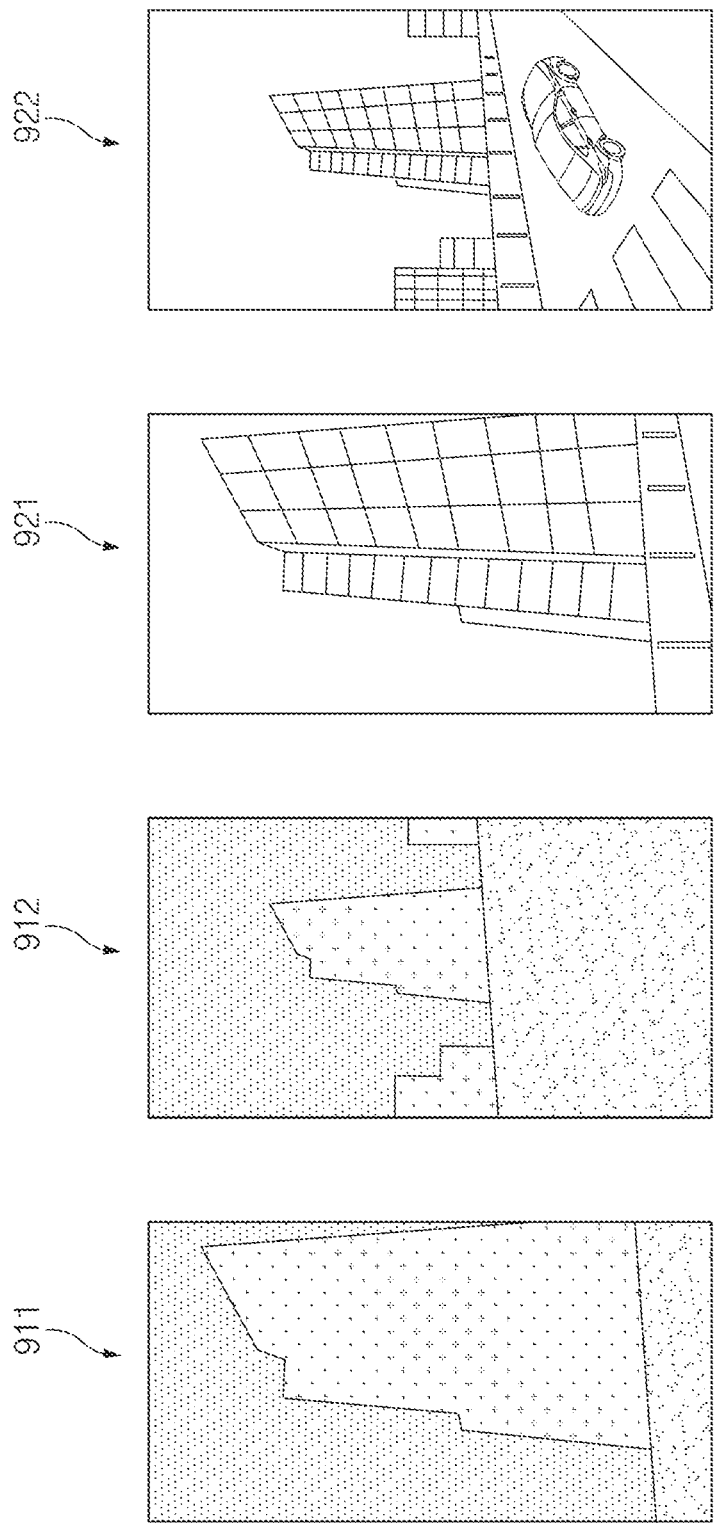
FIG. 9 illustrates storage of first images of various angles of view according to an embodiment of the disclosure.

FIG. 9 illustrates storage of first images of various angles of view according to an embodiment of the disclosure.

Referring to FIG. 9, a processor 120 or a server 108 may store a feature point database for first images corresponding various points (e.g., virtual points) of a 3D virtual map, various angles (e.g., virtual angles), or various angles of view (virtual angles of view). For example, the processor 120 or the server 108 may store feature point information of each of a first view angle image 911 and a second view angle image 912, which have the same position information.

The processor 120 or the server 108 may use setting information (e.g., zoom magnification and/or view angle information) of a camera module 180 for feature point comparison, in the feature point database.

For example, when a first original image 921 having a first angle of view is captured, the processor 120 or the server 108 may use a feature vector of the first view angle image 911 corresponding to the first angle of view between the first view angle image 911 and the second view angle image 912, which have the same position information, and may fail to use a feature vector of the second view angle image 912.

For another example, when a second original image 922 having a second angle of view is captured, the processor 120 or the server 108 may use the feature vector of the second view angle image 912 corresponding to the second angle of view between the first view angle image 911 and the second view angle image 912, which have the same position information, and may fail to use the feature vector of the first view angle image 911. As a result, accuracy and a speed of feature point comparison may be enhanced.

Figure 10:
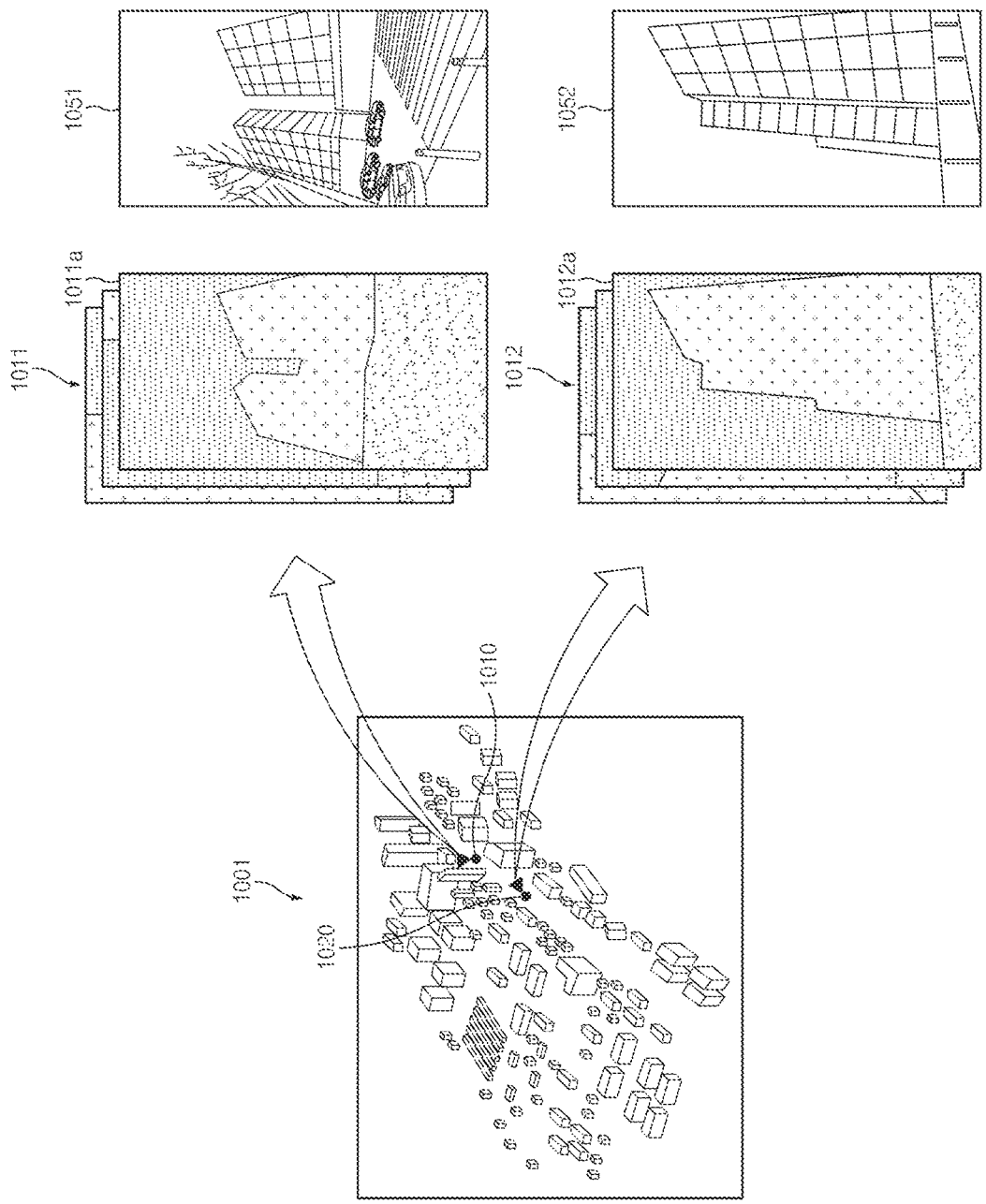
FIG. 10 illustrates matching between a virtual first image and an actually captured second image according to an embodiment of the disclosure.

FIG. 10 illustrates matching between a virtual first image and an actually captured second image according to an embodiment of the disclosure.

Referring to FIG. 10, a processor 120 of an electronic device 101 or a server 108 may generate a 3D virtual map 1001. The 3D virtual map 1001 may be a map rendered and generated based on text information, such as elevation data (e.g., the highest height above sea level) and/or artificial structure data, rather than an actually captured image.

According to various embodiments, the processor 120 or the server 108 may extract at least one a plurality of first images 1011 and 1012 based on first position information of the electronic device 101 (e.g., a latitude/longitude and/or an azimuth angle measured by means of a wireless communication module 192 and/or a sensor module (e.g., a sensor module 176 of FIG. 1)). The processor 120 or the server 108 may compare feature points of the plurality of first images 1011 and 1012 with feature points of second images 1051 and 1052 captured by means of a camera module 180.

For example, the processor 120 or the server 108 may extract the plurality of first images 1011 corresponding to a first position 1010. The processor 120 or the server 108 may determine a first image 1011a in which a hash hamming distance from a geographic feature image based on the second image 1051 is minimized among the plurality of first images 1011 and may calculate a position and an azimuth at the first position 1010 as second position information which is more accurate than the first position information (e.g., the latitude/longitude and/or the azimuth angle measured by means of the wireless communication module 192 and/or the sensor module (e.g., the sensor module 176 of FIG. 1)) based on second position information corresponding to the determined first image 1011a.

For another example, the processor 120 or the server 108 may extract the plurality of first images 1012 corresponding to the second position 1020. The processor 120 or the server 108 may determine a first image 1012a in which a hash hamming distance from a geographic feature image based on the second image 1052 is minimized among the plurality of first images 1012 and may calculate a position and an azimuth at a second position 1020 of the electronic device 101 as second position information which is more accurate than the first position information (e.g., the latitude/longitude and/or the azimuth angle measured by means of the wireless communication module 192 and/or the sensor module (e.g., the sensor module 176 of FIG. 1)) based on second position information corresponding to the determined first image 1012a.

An electronic device (e.g., an electronic device 101 of FIG. 1) according to various embodiments may include a camera module (e.g., a camera module 180 of FIG. 1) configured to collect image data, a communication circuit configured to perform communication with an external device, a memory (e.g., a memory 130 of FIG. 1), and a processor (e.g., a processor 120 of FIG. 1). The processor (e.g., the processor 120 of FIG. 1) may obtain first position information about the electronic device (e.g., the electronic device 101 of FIG. 1), may store first feature point information based on the first position information, may obtain an image by means of a camera module (e.g., a camera module 180 of FIG. 1), may recognize an object from the image, may extract second feature point information about the recognized object, and may calculate second position information of higher accuracy than the first position information based on comparing the first feature point information with the second feature point information.

According to various embodiments, the electronic device (e.g., the electronic device 101 of FIG. 1) may further include a sensor module. The first position information may be obtained by means of the sensor module.

According to various embodiments, the first position information may include latitude, longitude, and azimuth angle information of the electronic device (e.g., the electronic device 101 of FIG. 1).

According to various embodiments, the first feature point information may be extracted from a three-dimensional virtual map rendered based on text information about terrain or feature.

According to various embodiments, the processor (e.g., the processor 120 of FIG. 1) may transmit the first position information to an external server (e.g., a server 108 of FIG. 1) and may receive the first feature point information corresponding to the first position information from the external server (e.g., the server 108 of FIG. 1).

According to various embodiments, the processor (e.g., the processor 120 of FIG. 1) may transmit the first position information to the external server (e.g., the server 108 of FIG. 1), may receive map data of a portion corresponding to the first position information in a three-dimensional virtual map rendered based on text information about terrain or feature from the external server (e.g., the server 108 of FIG. 1), and may extract the first feature point information from the map data.

According to various embodiments, the processor (e.g., the processor 120 of FIG. 1) may classify the recognized object into items of a first group.

According to various embodiments, the first group may include the sky, a building, or a road.

According to various embodiments, the processor (e.g., the processor 120 of FIG. 1) may classify an object which is not classified into the first group among the recognized objects into items of a second group.

According to various embodiments, the processor (e.g., the processor 120 of FIG. 1) may reclassify the object classified into the second group into an item of the first group depending on a specified condition.

According to various embodiments, the processor (e.g., the processor 120 of FIG. 1) may extract the second feature point information, when the object classified into the first group is greater than or equal to a specified number.

According to various embodiments, the processor (e.g., the processor 120 of FIG. 1) may extract the second feature point information, when the ratio of the number of pixels of the object classified into the second group to all pixels of the second image is less than or equal to a specified number.

According to various embodiments, the processor (e.g., the processor 120 of FIG. 1) may extract the second feature point information, when a ratio which is not blocked by an object of the second group among border lines among objects of the first group is greater than equal to a specified value.

According to various embodiments, the first position information may have a first error range, and the second position information may have a second error range less than the first error range.

An electronic device (e.g., an electronic device 101 of FIG. 1) according to various embodiments may include a camera module (e.g., a camera module 180 of FIG. 1) configured to collect image data, a communication circuit configured to perform communication with an external device, a memory (e.g., a memory 130 of FIG. 1), and a processor (e.g., a processor 120 of FIG. 1). The processor (e.g., the processor 120 of FIG. 1) may obtain first position information about the electronic device (e.g., the electronic device 101 of FIG. 1), may extract first feature point information from a region corresponding to the first position information in a three-dimensional virtual map rendered based on text information about terrain or feature, may obtain an image by means of a camera module (e.g., a camera module 180 of FIG. 1), may recognize an object from the image, may extract second feature point information about the recognized object, and may calculate second position information of higher accuracy than the first position information based on comparing the first feature point information with the second feature point information.

According to various embodiments, the processor (e.g., the processor 120 of FIG. 1) may extract the first feature point information based on setting information associated with capturing the image by means of the camera module (e.g., the camera module 180 of FIG. 1).

A method for obtaining position information using an image according to various embodiments may be performed in an electronic device (e.g., an electronic device 101 of FIG. 1), which may include obtaining first position information about the electronic device (e.g., the electronic device 101 of FIG. 1), storing first feature point information in a memory (e.g., a memory 130 of FIG. 1) of the electronic device (e.g., the electronic device 101 of FIG. 1) based on the first position information, obtaining an image by means of the camera, recognizing an object from the image, extracting second feature point information about the recognized object, and calculating second position information of higher accuracy than the first position information based on comparing the first feature point information with the second feature point information.

According to various embodiments, the obtaining of the first position information may include obtaining the first position information by means of a sensor module of the electronic device (e.g., the electronic device 101 of FIG. 1).

According to various embodiments, the storing of the first feature point information may include extracting the first feature point information from a three-dimensional virtual map rendered based on text information about terrain or feature.

According to various embodiments, the storing of the first feature point information may include transmitting the first position information to an external server (e.g., a server 108 of FIG. 1) and receiving the first feature point information corresponding to the first position information from the external server (e.g., the server 108 of FIG. 1).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a camera configured to collect image data;
   a communication circuit configured to perform communication with an external device;
   a memory; and
   a processor, the processor being configured to:
      obtain first position information having a first error range about the electronic device,
      transmit the first position information to an external server,
      receive map data of a portion corresponding to the first position information in a three-dimensional virtual map, wherein the three-dimensional virtual map is rendered based on text information about terrain or features by the external server,
      extract first feature point information from the map data,
      store the first feature point information,
      obtain an image via the camera,
      recognize objects from the image,
      generate a plurality of division images from the image based on positions where the recognized objects are arranged,
      combine the plurality of division images to generate a combined image,
      convert the combined image into a binary image,
      extract second feature point information including a code corresponding to a predetermined number of pixels in the binary image, and
      calculate second position information having a second error range less than the first error range based on comparing the first feature point information with the second feature point information.

2. The electronic device of claim 1, further comprising:
   a sensor,
   wherein the first position information is obtained via the sensor.

3. The electronic device of claim 1, wherein the first position information comprises latitude, longitude, and azimuth angle information of the electronic device.

4. The electronic device of claim 1, wherein the processor is further configured to classify the recognized object into items of a first group.

5. The electronic device of claim 4, wherein the first group comprises the sky, a building, or a road.

6. The electronic device of claim 4, wherein the processor is further configured to classify an object which is not classified into the first group among the recognized object into items of a second group.

7. The electronic device of claim 6, wherein the processor is further configured to reclassify the object classified into the second group into an item of the first group depending on a specified condition.

8. The electronic device of claim 6, wherein the processor is further configured to extract the second feature point information, in response to the object classified into the first group being greater than or equal to a specified number.

9. The electronic device of claim 6, wherein the processor is further configured to extract the second feature point information, in response to a ratio of a number of pixels of the object classified into the second group to all pixels of a second image being less than or equal to a specified value.

10. The electronic device of claim 6, wherein the processor is further configured to extract the second feature point information, in response to a ratio which is not blocked by an object of the second group among border lines among objects of the first group being greater than equal to a specified value.

11. The electronic device of claim 1, wherein a geographical feature of the image is converted into a one-dimensional vector.

12. The electronic device of claim 11, wherein the one-dimensional vector is used for matching a feature point.

13. The electronic device of claim 1, wherein the processor is further configured to compare a geographic feature image with a three dimensional (3D) virtual map.

* * * * *